(12) United States Patent
Mohanakrishnan et al.

(10) Patent No.: US 9,690,988 B2
(45) Date of Patent: Jun. 27, 2017

(54) IMAGE PROCESSING APPARATUS AND IMAGE PROCESSING METHOD FOR BLINK DETECTION IN AN IMAGE

(71) Applicant: FUJITSU LIMITED, Kawasaki-shi, Kanagawa (JP)

(72) Inventors: Jaikrishna Mohanakrishnan, Kawasaki (JP); Junichi Odagiri, Kawasaki (JP); Satoshi Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 363 days.

(21) Appl. No.: 13/936,011

(22) Filed: Jul. 5, 2013

(65) Prior Publication Data
US 2014/0063221 A1   Mar. 6, 2014

(30) Foreign Application Priority Data

Aug. 31, 2012 (JP) .................................. 2012-192375

(51) Int. Cl.
*G06K 9/00* (2006.01)
(52) U.S. Cl.
CPC ..... *G06K 9/00597* (2013.01); *G06K 9/00845* (2013.01)
(58) Field of Classification Search
None
See application file for complete search history.

(56) References Cited

U.S. PATENT DOCUMENTS

| 6,714,665 B1* | 3/2004 | Hanna ................... G06K 9/00 382/106 |
| 2003/0086496 A1* | 5/2003 | Zhang ................ G06K 9/00711 375/240.16 |
| 2003/0112865 A1* | 6/2003 | Divakaran ......... G06K 9/00261 375/240.01 |

(Continued)

FOREIGN PATENT DOCUMENTS

| JP | 2001-043382 | 2/2001 |
| JP | 2002-074370 | 3/2002 |
| JP | 2008-171108 | 7/2008 |

OTHER PUBLICATIONS

H. Nguyen, L. Bai. "Cosine Similarity Metric Learning for Face Verification" Conference: Computer Vision—ACCV 2010—10th Asian Conference on Computer Vision, Queenstown, New Zealand, Nov. 8-12, 2010.*

(Continued)

*Primary Examiner* — Jorge L Ortiz Criado
*Assistant Examiner* — Stefan Gadomski
(74) *Attorney, Agent, or Firm* — Fujitsu Patent Center

(57) ABSTRACT

An image processing apparatus including a detection unit configured to detect a face area and an eye area from images that are sequentially input; a motion vector calculation unit configured to calculate, between two of the images, a first motion vector in the face area and second motion vectors in a plurality of blocks obtained by dividing the eye area; a similarity calculation unit configured to calculate, for each pair of the images, a value relevant to a similarity between the first motion vector and each of the second motion vectors; and a determination unit configured to determine whether blinking has occurred based on the value relevant to the similarity.

7 Claims, 14 Drawing Sheets

(56) References Cited

U.S. PATENT DOCUMENTS

| | | | |
|---|---|---|---|
| 2005/0008201 A1* | 1/2005 | Lee | G06K 9/00597 382/117 |
| 2005/0213792 A1* | 9/2005 | Hammoud | G06K 9/00604 382/103 |
| 2005/0271252 A1* | 12/2005 | Yamada | G06K 9/00335 382/103 |
| 2007/0286457 A1* | 12/2007 | Hammoud | A61B 3/113 382/103 |
| 2008/0166052 A1 | 7/2008 | Hatano | |
| 2008/0226175 A1* | 9/2008 | Suzuki | G06K 9/00597 382/190 |
| 2008/0260375 A1* | 10/2008 | Yumiki | H04N 5/23219 396/263 |
| 2009/0219415 A1* | 9/2009 | Matsunaga | H04N 5/272 348/239 |
| 2010/0071016 A1* | 3/2010 | Uhm | G06F 17/30811 725/114 |
| 2012/0162454 A1* | 6/2012 | Park | H04N 5/145 348/208.6 |
| 2012/0293627 A1* | 11/2012 | Ishii | H04N 13/0011 348/46 |
| 2012/0308079 A1* | 12/2012 | Akiyama | G06K 9/00845 382/103 |
| 2014/0055337 A1* | 2/2014 | Karlsson | G06F 3/013 345/156 |

OTHER PUBLICATIONS

K. Kollreider, H. Fronthaler, M. I. Faraj and J. Bigun, "Real-Time Face Detection and Motion Analysis With Application in "Liveness" Assessment," in IEEE Transactions on Information Forensics and Security, vol. 2, No. 3, pp. 548-558, Sep. 2007.*

Y. Li et al., "Chapter 3 Video Content Pre-processing" in "Video Content Analysis Using Multimodal Information" Springer Science+Business Media New York 2003.*

EESR—Extended European Search Report mailed on Mar. 6, 2015 issued with respect to the corresponding European Patent Application No. 13174186.0.

Kollreider, K et al; "Verifying Liveness by Multiple Experts in Face Biometrics", Computer Vision and Pattern Recognition Workshops, 2008. CVPR Workshops 2008. IEEE Computer Society Conference on, IEEE, Piscataway, NJ, USA, Jun. 23, 2008 (Jun. 23, 2008), pp. 1-6, XP031285671, ISBN: 978-1-4244-2339-2 cols. 4-8, paragraph 2.1; figure 1.

Sirohey, S et al; "A method of detecting and tracking irises and eyelids in video", Pattern Recognition, Elsevier, GB, vol. 35, No. 6, Jun. 1, 2002 (Jun. 1, 2002), pp. 1389-1401, XP004341802, ISSN: 0031-3203, DOI:10.1016/S0031-3203(01)00116-9.

Yacoob, Y et al; "Recognizing Human Facial Expressions", Image Understanding Workshop. Proceeding, vol. 2, Jan. 1, 1994 (Jan. 1, 1994), pp. 827-835, XP000884483.

P. Viola, et al., "Robust Real-Time Face Detection", International Journal of Computer Vision 57(2), pp. 137-154, 2004, Received Sep. 10, 2001; Revised Jul. 10, 2003; Accepted Jul. 11, 2003.

M. Pardas, "Extraction and Tracking of the Eyelids", Acoustics, Speech, and Signal Processing, ICASSP '00 Proceedings. 2000 IEEE International Conference on vol. 6, pp. 2357-2360 vol. 4, 2000 doi: 10.1109/ICASSP.2000.859314.

A. Gyaourova, et al. "Block Matching for Object Tracking", Technical report UCRL-TR-200271, Lawrence Livermore Technical Laboratory, (Oct. 2003).

B. D. Lucas, et al, An Alternative Image Registration Technique with an Application to Stereo Vision, IJCAI 81, Proceedings of the 7th international Joint conference on Artificial intelligence—vol. 2, pp. 674-679.

S. Haykin, Neural Networks: A Comprehensive Foundation (1st ed.) pp. 1-6, Prentice Hall PTR, Upper Saddle River, NJ, USA, 1994, Macmillan College Publishing Company.

G. Gomai, et al., "A New Approach for Pupil Detection in Iris Recognition System", Computer Engineering and Technology (ICCET), 2010 2nd International Conference on vol. 4, pp. V4-415-V4-419, Apr. 16-18, 2010 doi: 10.1109/ICCET.2010.5485497.

EPOA—Office Action mailed on Apr. 11, 2016 issued with respect to the corresponding European Patent Application No. 13174186.0.

Divjak, M., et al., "Eye blink based fatigue detection for prevention of Computer Vision Syndrome", Proceedings of MVA 2009 IAPR Conference on Machine Vision Applications, May 20-22, 2009, Yokohama, Japan, May 20, 2009 (May 20, 2009), pp. 350-353, XP002685053.

JPOA—Office Action mailed on May 10, 2016 issued with respect to the corresponding Japanese Patent Application No. 2012-192375, with partial English translation.

B.D. Lucas, et al., An Iterative Image Registration Technique with an Application to Stereo Vision, IJCAI 81, Proceedings of the $7^{th}$ International Joint conference on Artificial intelligence—vol. 2, pp. 674-679.

Matjaz Divjak et al: "Real-time video-based eye blink analysis for detection of low blink-rate during computer use", 1st International Workshop on Tracking Humans for the Evaluation of Their Motion in Image Sequences (THEMIS), Sep. 4, 2008 (Sep. 4, 2008), XP055262785, Leeds, UK.

R Heishman et al: "Using Image Flow to Detect Eye Blinks in Color Videos", 2007 IEEE Workshop on Applications of Computer Vision (WACV '07), Jan. 1, 2007 (Jan. 1, 2007), pp. 52-52, XP055330812, ISSN: 1550-5790, DOI: 10.1109/WACV.2007.61.

EPOA—European Office Action mailed on Jan. 9, 2017 issued with respect to the corresponding European Patent Application No. 13174186.0.

* cited by examiner

IMAGE PROCESSING APPARATUS AND IMAGE PROCESSING METHOD FOR BLINK DETECTION IN AN IMAGE

CROSS-REFERENCE TO RELATED APPLICATION

This patent application is based upon and claims the benefit of priority of the prior Japanese Patent Application No. 2012-192375 filed on Aug. 31, 2012, the entire contents of which are incorporated herein by reference.

FIELD

The embodiments discussed herein are related to an image processing apparatus and an image processing method for detecting blinking.

BACKGROUND

Blinking of eyes is medically known as being deeply related to the inner state of human beings. Therefore, it is considered that the inner state of a human being may be understood by detecting blinking from images and videos and analyzing the features.

As a technology for detecting blinking, there is a technology of detecting the difference between a face motion vector and an eye (eyelid) motion vector between images, and determining that blinking has been performed when the detected vector difference is downward and greater than a predetermined value (see, for example, patent document 1).

Patent document 1: Japanese Laid-Open Patent Publication No. 2001-43382

The blink detection technology is widely applied, such as to digital cameras. It is assumed that the digital camera has high resolution and a high frame rate when taking pictures, and that the target is still and staring at the camera.

However, in the field of user monitoring, there is demand for performing blink detection even when images are captured at low resolution, in consideration of cases where the target is moving and the performance of a low-cost camera.

When blink detection is performed with an image taken at low resolution, the following problems arise. In a low-resolution image, the feature points of the eye area tend to deform/disappear. The reason why feature points disappear and deform is that when the eyelids are closed, the black part of the eye and the white part of the eye disappear, and the color pattern in this area changes.

As a result, the motion vectors in the eye area become inaccurate, which leads to inaccuracy in the eye motion vectors expressing the motion of the eye. That is to say, there are cases where the eye motion vector does not appropriately express the motion in the eye area.

Furthermore, the motion amount of the face is greater than the motion amount of the eyes. In the case of a low-resolution image, a minor error margin in calculating the face motion vector may be the same as the motion amount of blinking. In the conventional technology, blinking is determined based on the difference between an eye motion vector and a face motion vector, and therefore erroneous detections may be made with images in which the face moves.

That is to say, in the blinking determination of the conventional technology, the motions are expressed as one representative value (the difference between the face motion vector and the eye motion vector). Therefore, if the representative value includes an error, erroneous detections or failures in making detections may occur.

SUMMARY

According to an aspect of the embodiments, an image processing apparatus includes a detection unit configured to detect a face area and an eye area from images that are sequentially input; a motion vector calculation unit configured to calculate, between two of the images, a first motion vector in the face area and second motion vectors in a plurality of blocks obtained by dividing the eye area; a similarity calculation unit configured to calculate, for each pair of the images, a value relevant to a similarity between the first motion vector and each of the second motion vectors; and a determination unit configured to determine whether blinking has occurred based on the value relevant to the similarity.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

First, the observation point of the following embodiments is described. When one motion vector is obtained from the entire eye area when blinking is performed as in the conventional technology, the feature points disappear/deform, and therefore the accurate difference between the motion amount in the eye area and the motion amount of the face is not obtained. However, if the eye area is divided into small blocks and a group of motion vectors are obtained, the direction of the motion vectors in the eye area is different from the motion vector of the entire face, regardless of whether the face is moving or not.

Figure 1:
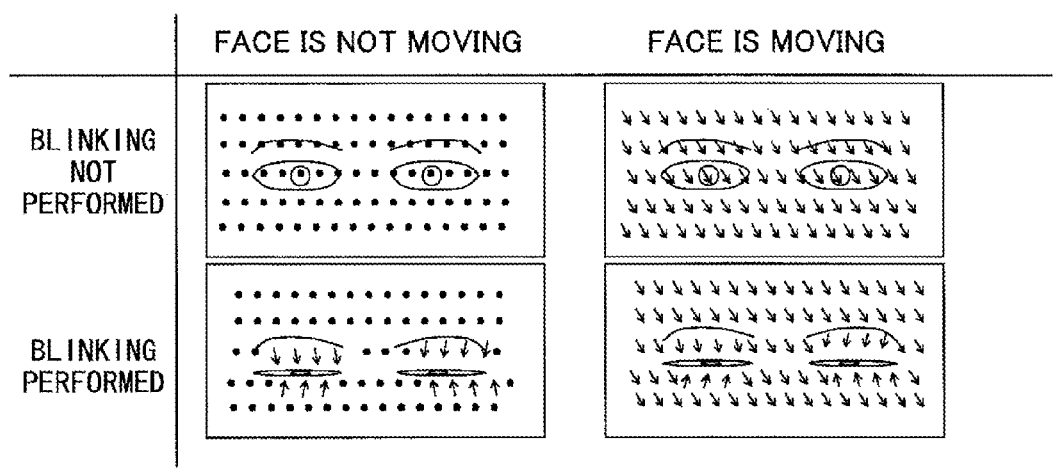
FIG. 1 illustrates motion vectors in an ideal eye area.

FIG. 1 illustrates motion vectors in an ideal eye area. As illustrated in FIG. 1, when the face is not moving, and blinking is performed, the motion vectors in the eye area and the motion vectors in the face area (no motion) are different. Furthermore, when the face moves to the bottom right direction, and blinking is performed, the motion vectors in the eye area and the motion vectors in the face area (bottom right direction) are different.

Figure 2:
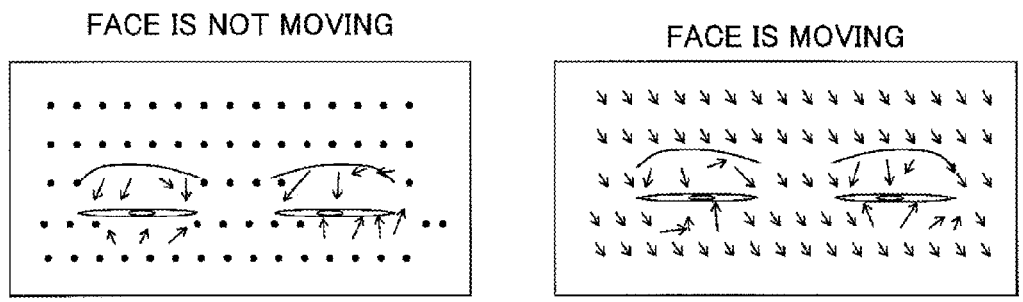
FIG. 2 illustrates motion vectors in the actual eye area.

FIG. 2 illustrates motion vectors in the actual eye area. As illustrated in FIG. 2, when the eyes are closed, the feature points disappear or deform, and the motion vectors in the actual eye area tend to be directed in various directions, unlike the case of the ideal eye area.

In this case also, as illustrated in FIG. 2, regardless of whether the face is moving, the motion vectors in the eye area and the motion vectors in the face area are different. Furthermore, when the resolution is low, the image becomes rough and therefore the feature points tend to disappear or deform even more. For example, low resolution means a resolution of less than or equal to 640×480 pixels.

Preferred embodiments of the present invention will be explained with reference to accompanying drawings, in which the difference between the motion vectors in the eye area and the motion vectors in the face area at the time of blinking is observed, and blink detection is performed based on this observation point as described above.

Embodiment

Hardware

Figure 3:
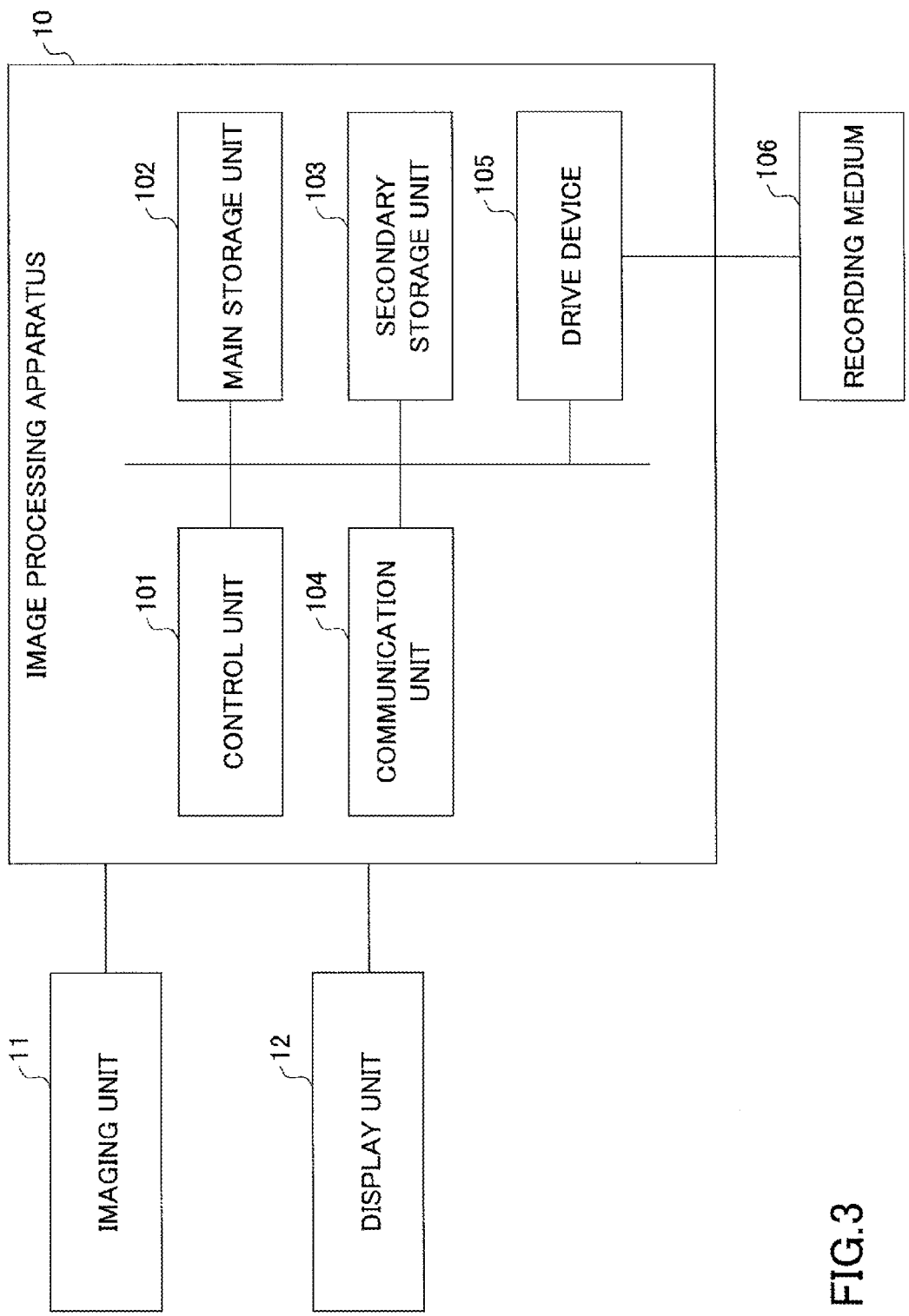
FIG. 3 is a block diagram of hardware of an image processing apparatus according to an embodiment.

FIG. 3 is a block diagram of hardware of an image processing apparatus 10 according to an embodiment. In the embodiment illustrated in FIG. 3, the image processing apparatus 10 is connected to an imaging unit 11 and a display unit 12.

The imaging unit 11 is a device such as a digital camera for generating digital images. The imaging unit 11 takes pictures of the face of a person and generates an image including the face of a person. The imaging unit 11 outputs the generated images to the image processing apparatus 10 in the order the images have been taken.

The image processing apparatus 10 detects the face area and the eye area from the acquired image, and detects blinking based on the similarity between the motion vectors in the detected areas. The image processing apparatus 10 may store the detection result of blinking or output the detection result of blinking to the display unit 12.

The display unit 12 is, for example, an LCD (Liquid Crystal Display) or an EL (Electroluminescence) display. The display unit 12 displays the result of blink detection acquired from the image processing apparatus 10.

The image processing apparatus 10 includes a control unit 101, a main storage unit 102, a secondary storage unit 103, a communication unit 104, and a drive device 105 as hardware. The respective units are connected to each other via a bus so that data transmission/reception may be performed with each other.

The control unit 101 is a CPU (Central Processing Unit) for controlling the respective devices and performing calculation and processing on data in a computer. Furthermore, the control unit 101 is a processor for executing programs stored in the main storage unit 102 and the secondary storage unit 103. The control unit 101 receives data from an input device and a storage device, performs calculation and processing on the received data, and outputs the data to an output device and a storage device.

The main storage unit 102 is, for example, a ROM (Read Only Memory) or a RAM (Random Access Memory). The main storage unit 102 is a storage device for storing or temporarily saving an OS that is the basic program and programs such as application software executed by the control unit 101, and data.

The secondary storage unit 103 is, for example, a HDD (Hard Disk Drive), which is a storage device for storing data relevant to application software. The secondary storage unit 103 stores, for example, images acquired from the imaging unit 11.

The communication unit 104 performs data communications with peripheral devices in a wired or wireless manner. For example, the communication unit 104 may acquire an image including the face of a person via a network and store the acquired image in the secondary storage unit 103.

The drive device 105 reads a predetermined program from a recording medium 106 such as a flexible disk and a CD (Compact Disc), and installs the program in a storage device.

Furthermore, a predetermined program is stored in the recording medium 106, and the program stored in the recording medium 106 is installed in the image processing apparatus 10 via the drive device 105. The predetermined program that has been installed becomes executable by the image processing apparatus 10.

The image processing apparatus 10 is separate from the imaging unit 11 and the display unit 12; however, the image processing apparatus 10 may include one of or both of the imaging unit 11 and the display unit 12.

Functions

Figure 4:
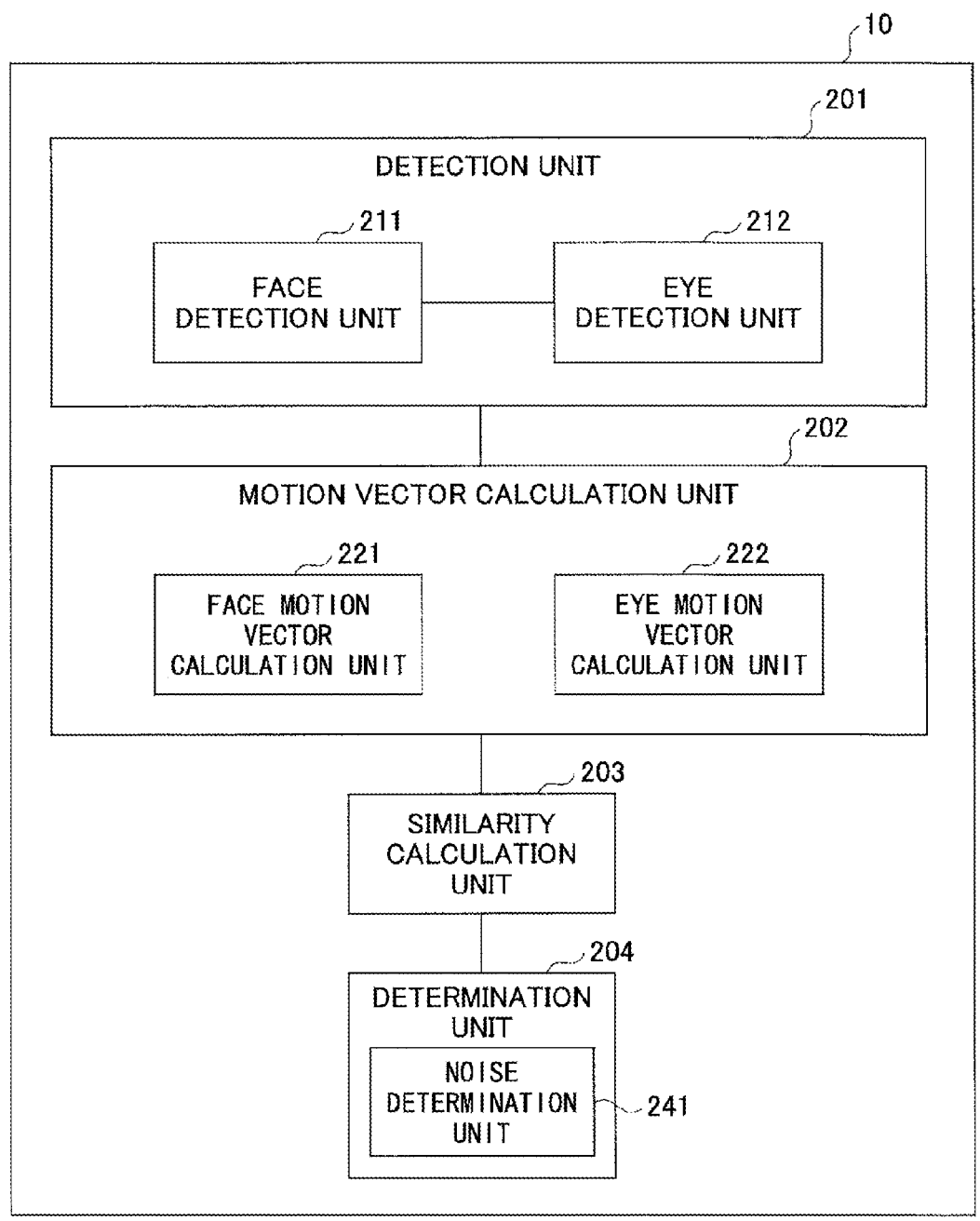
FIG. 4 is a functional block diagram of the image processing apparatus according to the embodiment.

FIG. 4 is a functional block diagram of the image processing apparatus 10 according to the present embodiment. In the example of FIG. 4, the image processing apparatus 10 includes a detection unit 201, a motion vector calculation unit 202, a similarity calculation unit 203, and a determination unit 204.

The detection unit 201, the motion vector calculation unit 202, the similarity calculation unit 203, and the determination unit 204 are realized by, for example, the control unit 101 and the main storage unit 102 as a work memory. That is to say, the detection unit 201, the motion vector calculation unit 202, the similarity calculation unit 203, and the determination unit 204 function by being executed by the control unit 101.

The detection unit 201 detects the face area and the eye area from images that are sequentially input. For example, in the detection unit 201, an image i (standard image) taken at a time t and an image i+n taken at a time t+Δt (reference image) are input from the imaging unit 11. The standard image and the reference image are preferably the same size.

Furthermore, the detection unit 201 includes a face detection unit 211 for detecting a face area and an eye detection unit 212 for detecting an eye area. The face detection unit 211 detects the face area by machine learning using edge data of the standard image (see, for example, "P. Viola, M. Jones. Robust real-time face detection, Computer Vision, 2001. ICCV 2001. Proceedings. Eighth IEEE International Conference on, vol. 2, 2001doi: 10.1109/ICCV.2001.937709"). The face area includes closed curved lines depicting a rectangular area or the contour of a face.

The eye detection unit 212 acquires the detection result of the face detection unit 211, and detects the eye area from the standard image in which a face has been detected, by pupil detection or template matching (see, for example, "M. Pardas. Extraction and tracking of the eyelids, Acoustics, Speech, and Signal Processing, 2000. ICASSP '00. Proceedings. 2000 IEEE International Conference on, vol. 6, no., pp. 2357-2360 vol. 4, 2000 doi: 10.1109/ICASSP.2000.859314").

The detection unit 201 outputs, to the motion vector calculation unit 202, the face area detected by the face detection unit 211 and the eye area detected by the eye detection unit 212.

The motion vector calculation unit 202 calculates the motion vectors in the face area and the motion vectors of plural blocks obtained by dividing the eye area, of two images adjacent to each other time wise. The motion vector in the face area is also referred to as a first motion vector or a face motion vector, and the motion vectors in the blocks in the eye area are also referred to as second motion vectors or eye motion vectors.

The motion vector calculation unit 202 includes a face motion vector calculation unit 221 and an eye motion vector calculation unit 222. The face motion vector calculation unit 221 obtains one representative motion vector from the face area. For example, the face motion vector calculation unit 221 divides the face area into plural blocks and sets the mode of the motion vectors in the blocks as the representative motion vector, or sets an average motion vector obtained based on an arbitrary number of feature points in the face area as the representative motion vector.

The eye motion vector calculation unit 222 divides the eye area into plural blocks and calculates a motion vector for each block. The reason why a motion vector is calculated for each block is to find a motion that has occurred in the eye area. When blinking is performed, feature points in the eye area move, and a motion vector is calculated. Furthermore, blinking may be detected by comparing the motion in the eye area with the motion in the face area.

The motion vector calculation unit 202 outputs, to the similarity calculation unit 203, a first motion vector calculated by the face motion vector calculation unit 221 and a second motion vector calculated by the eye motion vector calculation unit 222.

The similarity calculation unit 203 calculates, for each pair of images, a value relevant to the similarity between the first motion vector and each of the second motion vectors. In this case, when blinking does not occur, the first motion vector and each of the second motion vectors are supposed to make the same motion. Therefore, in this case, the similarity between the first motion vector and each of the second motion vectors is high.

Meanwhile, when blinking occurs, due to the above observation point, the first motion vector and each of the second motion vectors make different motions, and therefore the similarity is low.

For example, the similarity calculation unit 203 uses, as a value relevant to the similarity, the average similarity between the first motion vector and each of the second motion vectors, or the number of second motion vectors that are different from the first motion vector. The similarity calculation unit 203 outputs the calculated value relevant to the similarity to the determination unit 204. A second motion vector different from the first motion vector is a second motion vector that does not match the first motion vector, such as a second motion vector outside a predetermined range of the direction and size of the first motion vector.

The determination unit 204 determines whether blinking has occurred based on the value relevant to the similarity. For example, the determination unit 204 determines whether blinking has occurred by comparing the value relevant to the similarity with a threshold. Furthermore, the determination unit 204 detects blinking by detecting both a closed eye and an open eye, which are parts of blinking. Therefore, when at least two parts of blinking are determined within a predetermined time, the determination unit 204 determines that blinking has occurred. The predetermined time is to be set to be slightly longer than 100 msec through 300 msec, which is the time taken for blinking.

Note that regardless of whether blinking occurs or an eyeball motion occurs, the motion vector direction in the eye area is different from the motion vector direction of the face area. Therefore, by distinguishing between blinking and an eyeball motion, the blink detection precision is further improved.

Thus, the determination unit 204 includes a noise determination unit 241. For example, after a part of blinking is determined, the noise determination unit 241 determines whether the detected part is noise based on characteristics including at least one of the number of second motion vectors, the direction of second motion vectors, and the length of second motion vectors. Noise means the disappearance of a feature point due to an eyeball motion or variations in the lighting conditions.

When a part of blinking is determined, the noise determination unit 241 detects the pupil or the iris from the eye area, and determines whether the detected part is noise based on the detection result of the motion of the pupil or the iris. According to the determination result of the noise determination unit 241, noise and blinking are distinguished.

Next, detailed descriptions are given of a motion vector calculation process, a similarity calculation process, and a determination process. First, a description is given of a motion vector calculation process Face Motion Vector Calculation Process The face motion vector calculation unit 221 divides the face area into plural blocks, and sets a characteristic pixel in each block as a feature point. A characteristic pixel is a pixel whose edge is stronger than the surroundings, or a pixel having a higher brightness than surrounding pixels.

Figure 5:
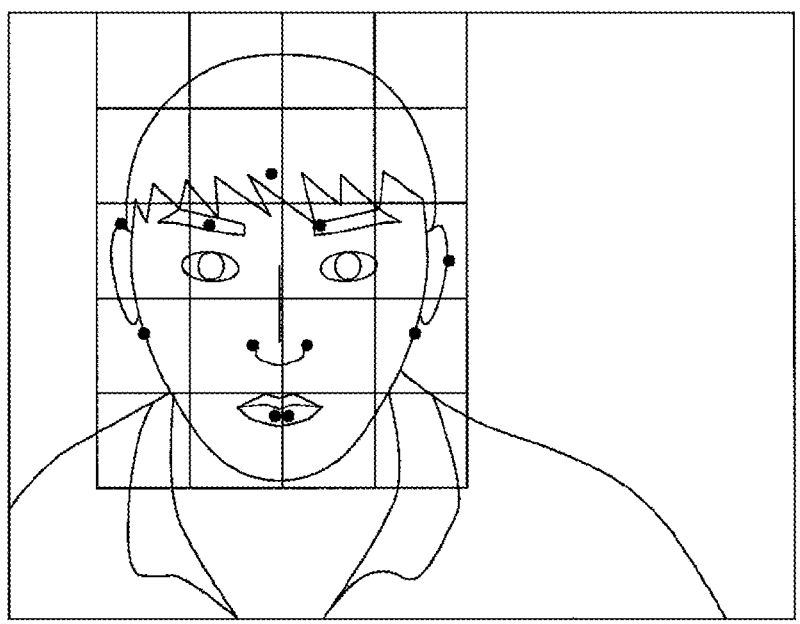
FIG. 5 illustrates examples of feature points in plural blocks obtained by dividing the face area.

FIG. 5 illustrates examples of feature points in plural blocks obtained by dividing the face area. In the example of FIG. 5, relatively large blocks are used for the sake of facilitating understanding; however, under actual circumstances, smaller blocks of 5×5 pixels are obtained by dividing the face area.

The face motion vector calculation unit 221 searches the reference image for a pixel that is most similar to the feature point extracted from the standard image. For example, the face motion vector calculation unit 221 uses the brightness values of pixels around the feature point (e.g., 5×5 pixels) as a template, and searches the reference image of a similar arrangement of colors.

The face motion vector calculation unit 221 uses a function such as SAD (Sum of Absolute Differences) for calculating the similarity between the template and the reference image. The similarity function used here is different from the "calculation function of similarity of vectors" of Formula (1) described below.

The face motion vector calculation unit 221 uses the position of the feature point in the standard image and the position of the feature point found by searching the reference image to define a motion vector. The start point of the motion vector is the position of the feature point in the standard image, and the end point is the position of a corresponding feature point in the reference image.

The face motion vector calculation unit 221 calculates the angular orientation distribution of motion vectors in the face area to detect blinking based on the observation point described above.

Figure 6:
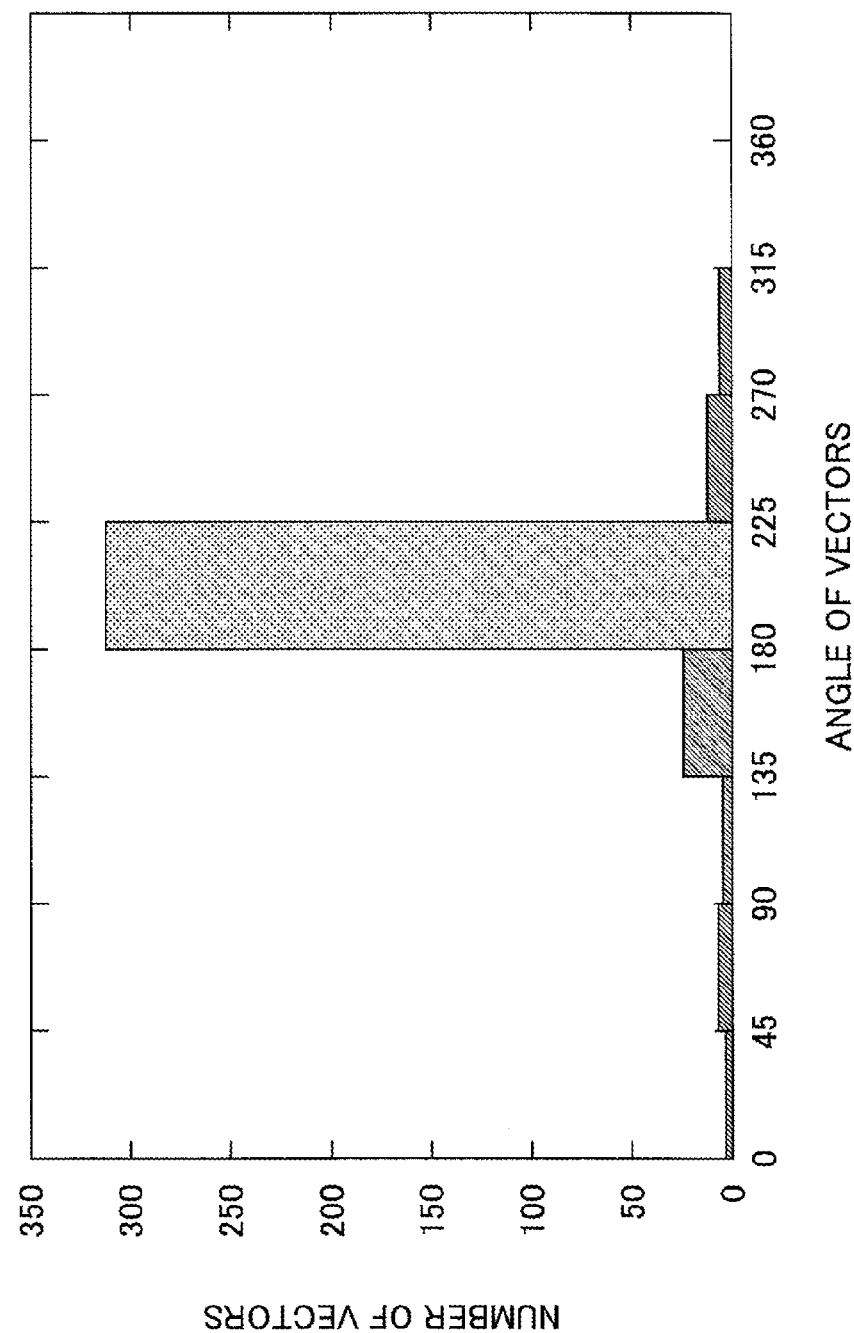
FIG. 6 illustrates an example of an angular orientation distribution of vectors in the face area in a state where vectors in the eye area according to blinking have become inaccurate.

FIG. 6 illustrates an example of the angular orientation distribution of vectors in the face area in a state where vectors in the eye area according to blinking have become inaccurate. FIG. 6 indicates the results obtained by dividing the face area into plural blocks, and obtaining an angular distribution at 45 degree intervals of the directions of motion vectors in the blocks.

The horizontal axis indicates the vector angle and vertical axis indicates the number of vectors. The angle of the mode peak indicates the motion direction of the face. Note when calculating the angle orientation distribution, the face motion vector calculation unit 221 quantizes the angles at θ degrees intervals (for example, θ=45 degrees). This is to determine the representative motion direction of the face without being affected by a slight error in the vector calculation.

As illustrated in FIG. 6, even if the motion vector becomes inaccurate, the face motion vector calculation unit 221 is capable of distinguishing between a motion vector of the face and a motion vector according to blinking, based on the angle orientation distribution.

Compared to the area of the eye area, the area of the face area is larger. Furthermore, the number of motion vectors in the face area is larger than the number of motion vectors in the eye area. Therefore, the vector direction that most frequently arises is considered to be the motion vector of the face.

Reason for Obtaining Angle Orientation Distribution

A description is given of the reason for obtaining the angle orientation distribution of the motion vectors in the face area. The reason why the distribution of the angles is used in the embodiment is to distinguish between a vector occurring due to the motion of the face and a motion vector occurring due to blinking.

When blinking is performed, the feature points disappear or deform, and the motion vectors in the eye area are directed to various motion directions (see FIG. 2). Accordingly, when the distribution of angles is expressed in a histogram, the motion vector of the face occupies the peak. By using this characteristic, a vector of the face and a vector of blinking are distinguished.

Assuming that an attempt is made to detect blinking with the use of the distribution of the length of vectors instead of the angle of vectors, it is not possible to appropriately detect the motion vector of the face. The reason is described below.

For example, consider that blinking occurs while the head is rotating to the left and right. When the head is rotating to the left and right (yaw motion), in a three-dimensional space, the distances by which the points of the face move are the same. However, when this motion is expressed by two-dimensional images, the motion amount of the points closer to the camera is larger, and the motion amount of the points further away from the camera is smaller.

Figure 7:
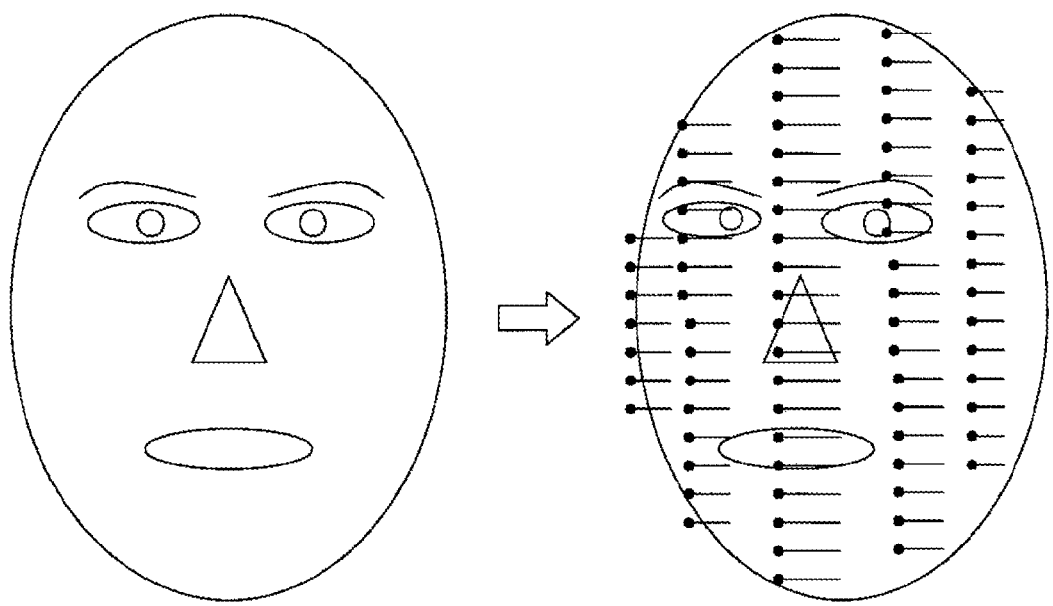
FIG. 7 illustrates the tendency of motion vectors that occur when the face rotates to the left and right.
Figure 8:
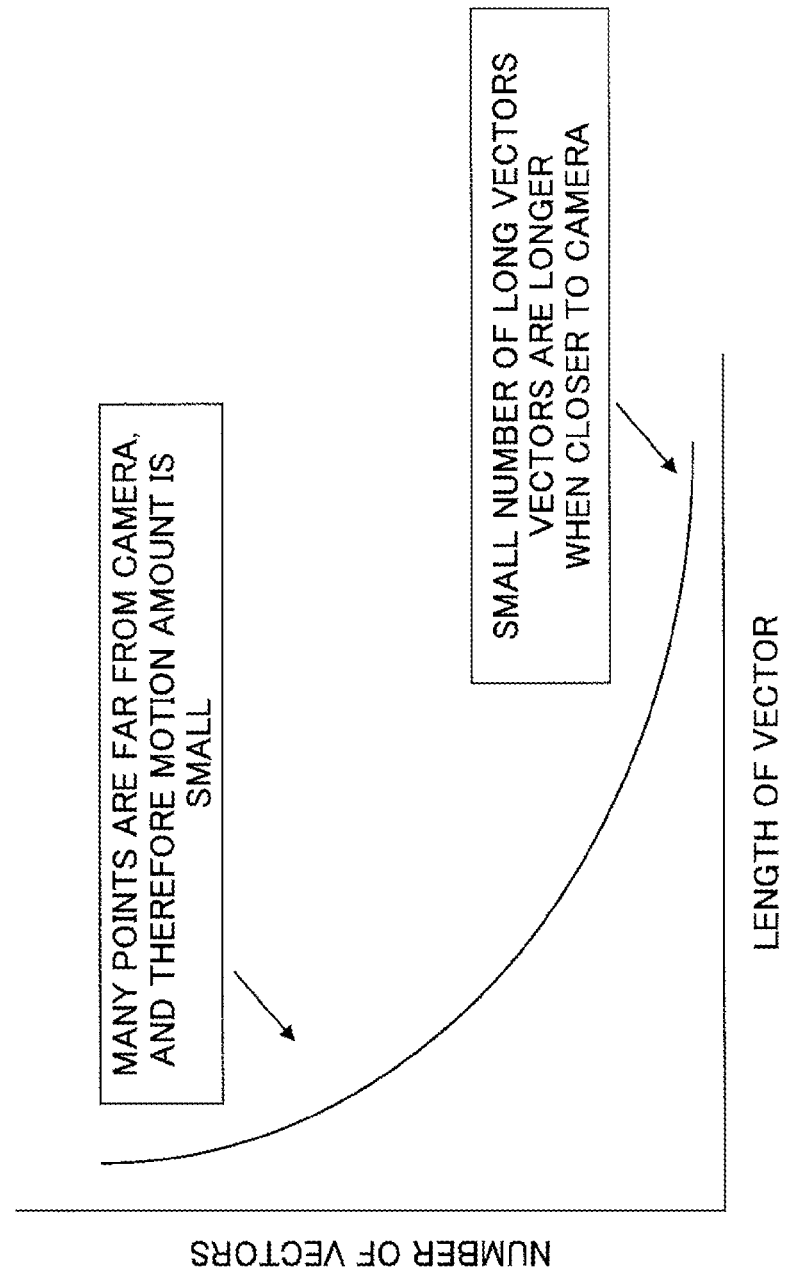
FIG. 8 illustrates a distribution of length of motion vectors.

FIG. 7 illustrates the tendency of motion vectors that occur when the face rotates to the left and right. As illustrated in FIG. 7, the motion vectors are longer at the center part that is close to the imaging unit 11, while the motion vectors become shorter toward the edges of the face. FIG. 8 is a histogram obtained by visualizing the distribution of the motion vectors in FIG. 7.

FIG. 8 illustrates an example of the distribution of lengths of vectors. As illustrated in FIG. 8, when the motion of blinking is small, and the motion vectors are inconsistent, the lengths of the motion vectors are basically short. When the motion amount of the face is small, the motion vector of the face and the motion vector of blinking have the same length. Thus, it is not possible to distinguish between the motion of blinking and the motion of the face, simply by viewing the distribution of lengths of vectors. Therefore, in order to detect blinking, the distribution of angles of motion vectors is to be viewed.

Note that the face motion vector calculation unit 221 only calculates at least one first motion vector of the face, and therefore there is no need to divide the face area into blocks. In this case, the face motion vector calculation unit 221 extracts one or more feature points in the face area, and obtains the average of the motions of the extracted feature point, to calculate the first motion vector.

Eye Motion Vector Calculation Process

Next, a description is given of the eye motion vector calculation process. The eye motion vector calculation unit 222 obtains a group of motion vectors by dividing the eye area into small blocks (for example, 5×5 pixels) (see, for example, A. Gyaourova, C. Kamath, S. C. Cheung. Block matching for object tracking. Technical report UCRL-TR-200271. Lawrence Livermore Technical Laboratory, (October 2003), and B. D. Lucas, T. Kanade. An iterative image registration technique with an application to stereo vision, IJCAI '81, Proceedings of the 7th international Joint conference on Artificial intelligence—Volume 2, pp. 674-679).

For example, the eye motion vector calculation unit 222 sets one characteristic pixel in each block as the feature point. A characteristic pixel is a pixel whose edge is stronger than the surroundings, or a pixel having a higher brightness than surrounding pixels.

The eye motion vector calculation unit 222 uses the positions of the feature points in the standard image and the positions of the feature points found by searching the reference image, to define motion vectors. The start point of the motion vector is the position of the feature point in the standard image, and the end point is the position of a corresponding feature point in the reference image.

Figure 9:
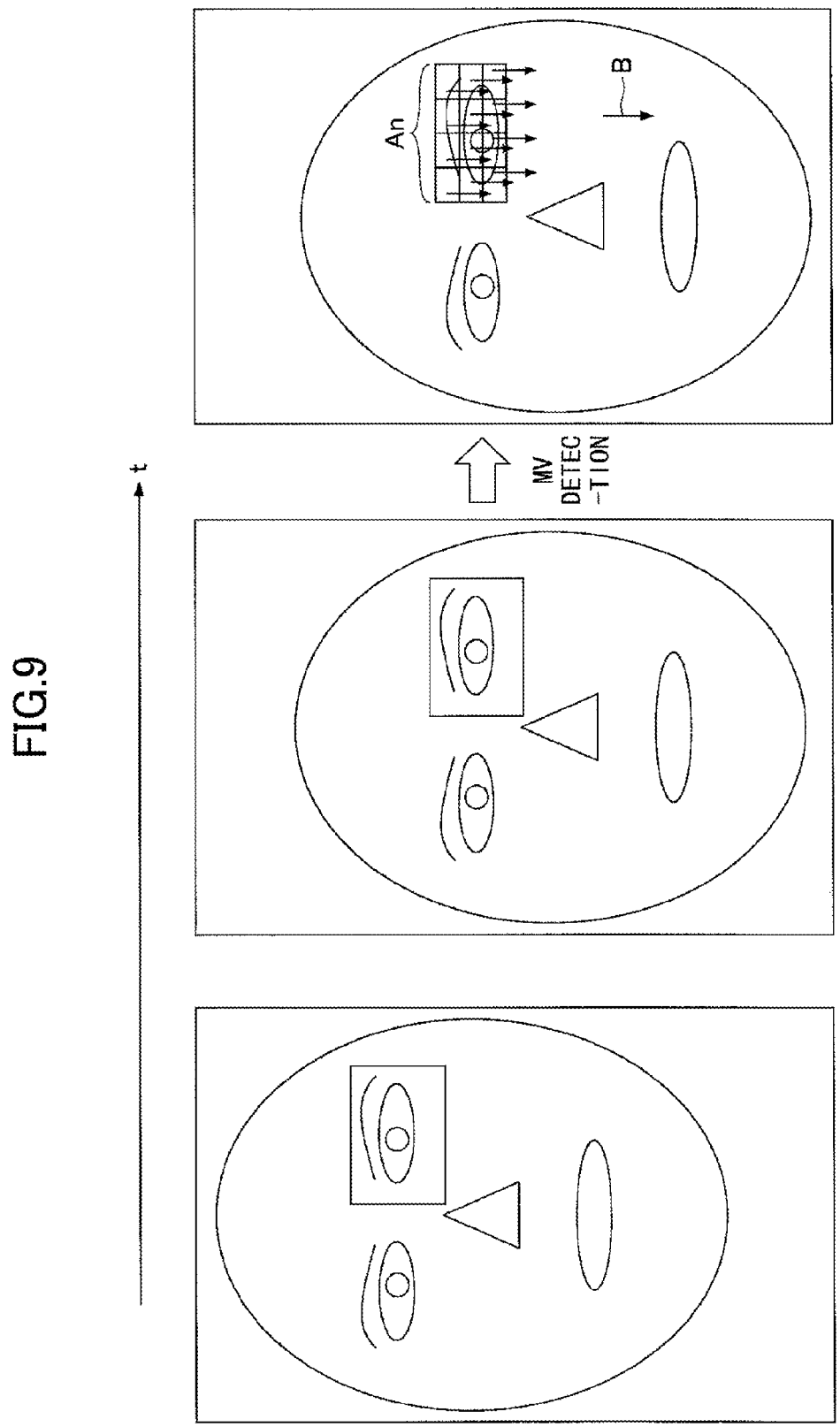
FIG. 9 illustrates a group of motion vectors in the eye area in a case where the face moves but blinking does not occur.

FIG. 9 illustrates a group of motion vectors in the eye area in a case where the face moves but blinking does not occur. In the example of FIG. 9, the face is moving downward without blinking. In the example of FIG. 9, with the image after the face has moved, the motion vectors An in the eye area are calculated. The motion vectors An in the eye area are the same as a motion vector B of the face.

Figure 10:
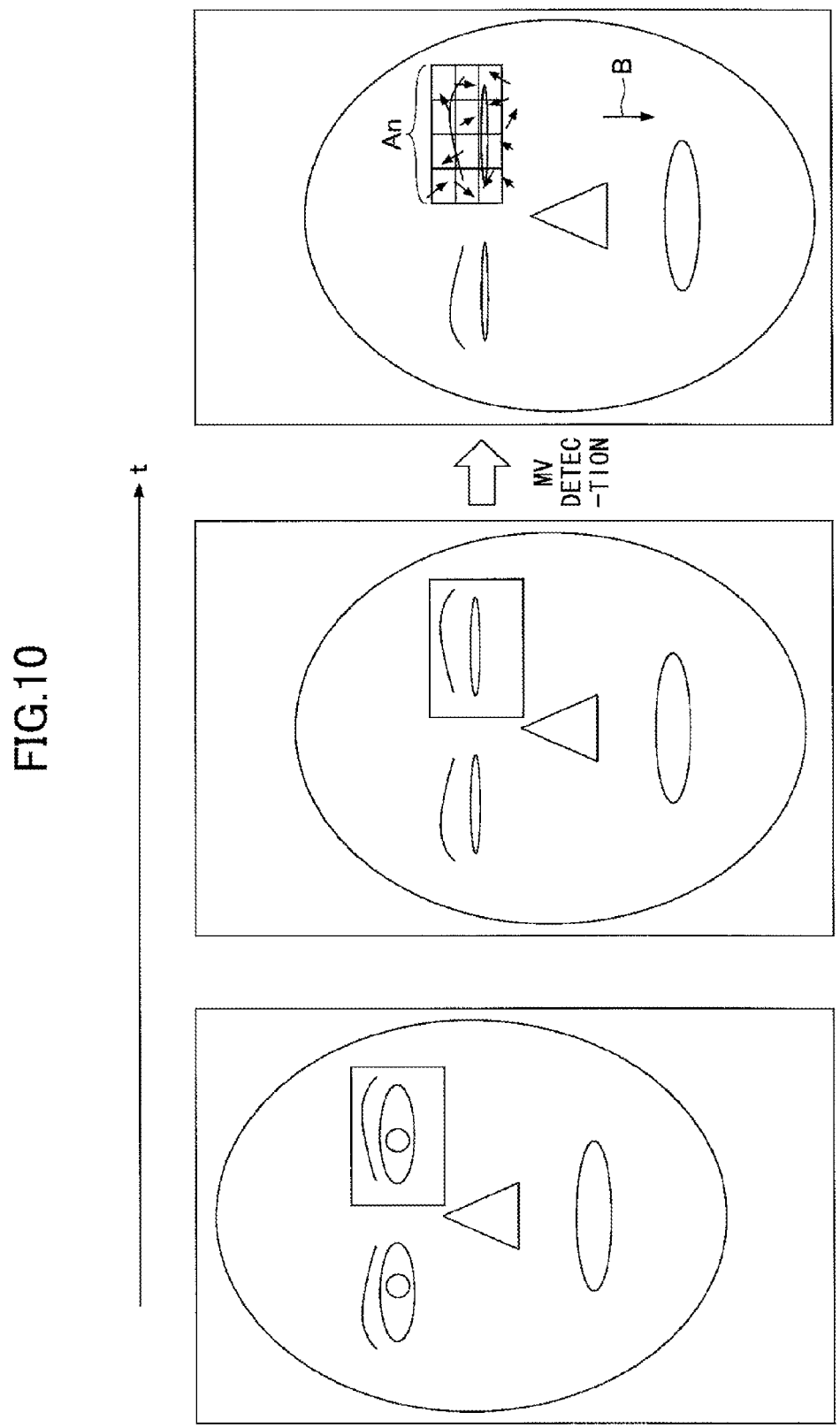
FIG. 10 illustrates a group of motion vectors in the eye area in a case where the face moves and blinking occurs.

FIG. 10 illustrates a group of motion vectors in the eye area in a case where the face moves and blinking occurs. In the example of FIG. 10, the face is moving downward while blinking occurs. In the example of FIG. 10, with the image after the face has moved, the motion vectors An in the eye area are calculated. Hardly any of the motion vectors An in the eye area match a motion vector B of the face.

Similarity Calculation Process

Next, a similarity calculation process is described. When blinking does not occur, the feature points in the eye area make the same motion as the face (see FIG. 9). Thus, the similarity between the motion vectors in the eye area and the motion vector in the face area is high.

In order to calculate the value relevant to the similarity, for example, the similarity calculation unit 203 uses a generally used cosine similarity (Formula (1)) to calculate the similarity of vectors.

$$\text{similarity} = \cos(\theta) = \frac{A \cdot B}{\|A\|\|B\|} \quad \text{Formula (1)}$$

The cosine similarity is a method of calculating the inner product by normalizing the vector. In Formula (1), both A and B respectively indicate vectors. ||A|| and ||B|| respectively indicate the lengths of A and B.

With this similarity function, the similarity between the motion vector in the face area and the motion vector in the eye area is a value between [−1.0, +1.0]. When the similarity is +1.0, the angles of the motion vector in the face area and the motion vector in the eye area are most similar to each other. When the similarity is −1.0, the angles of the vectors are exactly the opposite.

The similarity calculation unit 203 calculates the similarity between the motion vector in each of the blocks in the eye area and the motion vector in the face area. The similarity calculation unit 203 calculates a representative value (for example, the average) of the calculated similarities.

Furthermore, as another value relevant to the similarity, the similarity calculation unit 203 may use the number of eye motion vectors that are different from the face motion vector. Accordingly, when blinking occurs, this number increases, and when blinking does not occur, this number decreases.

Determination Process

Next, a description is given of the determination process. For example, when the similarity is used, the determination unit 204 compares the representative value of similarities with a threshold, and when the representative value of similarities is greater than the threshold, the motion vectors in the eye area are similar to the motion vector of the face, and therefore the determination unit 204 determines that blinking has not occurred.

Furthermore, when the representative value of similarities is less than or equal to the threshold, the motion vectors in the eye area are not similar to the motion vector of the face, and therefore the determination unit 204 determines that blinking has occurred. In this determination, even if the motion vectors are slightly inaccurate, the representative value of similarities is not largely affected.

Furthermore, for example, when the number of motion vectors is used, the determination unit 204 compares the number with a threshold, and when the number is greater than the threshold, the determination unit 204 determines that blinking has occurred. When the number is less than or equal to the threshold, the determination unit 204 determines that blinking has not occurred.

When blinking has occurred, the motion vectors in the blocks included in the eyelid area are directed to an arbitrary direction. Therefore, the number of blocks in the eyelid area corresponding to the size of the detected eye area is checked in advance, and a threshold is to be set in advance based on the number of blocks.

Noise Determination 1

Next, a description is given of a method of determining noise (for example, disappearance of a feature point due to an eyeball motion or variations in the lighting conditions). In the following description, an eyeball motion is taken as an example of noise. Generally, motion amounts other than blinking in the eye area are small, and therefore the number of noise vectors that occur is less than the number of vectors that occur at the time of blinking.

The reason is because when the eyelid is closed, all of the feature points in the white part of the eye and the black part of the eye disappear. Meanwhile, at the time of eyeball motion, the white part of the eye and the black part of the eye are not completely hidden, and only some of the feature points move.

Based on this characteristic, the noise determination unit 241 uses the number of motion vectors occurring in the eye area to distinguish between blinking and a noise vector. For example, the determination method may be performed by learning a neural network (see, for example, S. Haykin, Neural Networks: A Comprehensive Foundation (1st ed.), pp. 1-6, Prentice Hall PTR, Upper Saddle River, N.J., USA., 1994, Macmillan College Publishing Company), or by using a threshold.

Figure 11:
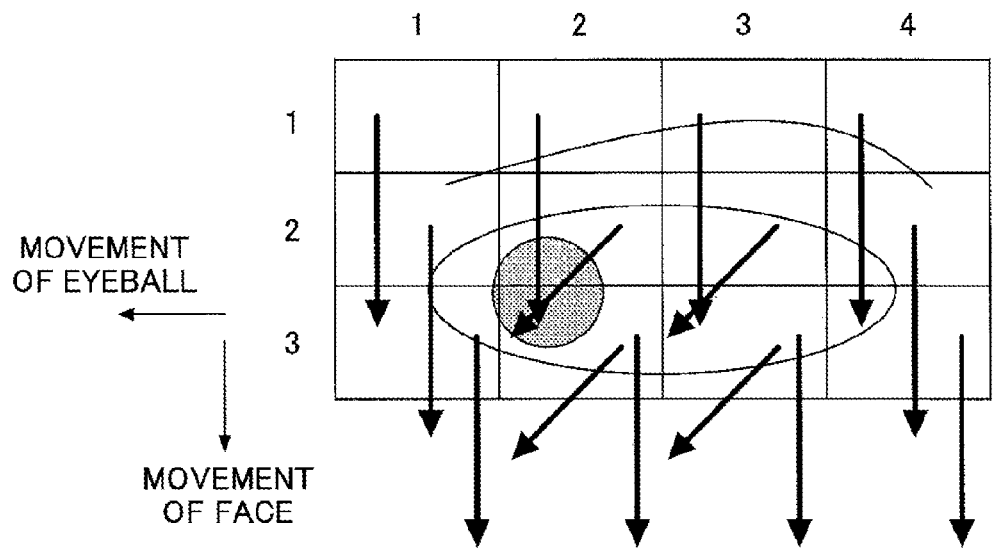
FIG. 11 is for describing noise determination (part 1)

FIG. 11 is for describing noise determination (part 1). As illustrated in FIG. 11, it is assumed that when the face moves downward, the eyeball moves to the left direction. Furthermore, each of the blocks in FIG. 11 is expressed as $b_{nm}$ (n=1 through 3, m=1 through 4)

In this case, the motion vector of the block in the eyeball part is directed to a direction obtained by adding the motion direction of the face and the motion direction of the eyeball. In the blocks illustrated in FIG. 11, the motion vectors of four blocks ($b_{22}$, $b_{23}$, $b_{32}$, $b_{33}$) are directed in directions different from that of the motion vector of the face.

Meanwhile, in the example of FIG. 11, when blinking is performed, for example, the motion vectors in the eight blocks ($b_{21}$~$b_{24}$, $b_{31}$~$b_{34}$) including the eye part are considered to be directed in a direction different from that of the motion vector of the face, due to the disappearance of feature points.

Therefore, in the example of FIG. 11, the noise determination unit 241 may determine that blinking has occurred when the number of motion vectors of the eye that do not match the motion vector of the face, in this case, six or more, and determine that noise is detected when this number is less than six. Furthermore, the number of blocks may vary according to the size of the eye area, and therefore the noise determination unit 241 may change the threshold according to the size of the eye area.

For example, the size of the eye area and the threshold to be used as a standard are determined according to experiments, and the noise determination unit 241 may multiply the standard threshold by the ratio of the size of the eye area in the actual image and the size of the eye area of the standard, to change the threshold.

Furthermore, the noise determination unit 241 may use a neural network to learn, in advance, the characteristics of motion vectors in the case of noise and the characteristics of motion vectors in the case of blinking, and may determine whether the detection is noise or blinking by inputting the characteristics of the motion vector. Characteristics of the motion vector include at least one of direction, length, and number.

Noise Determination 2

Next, a description is given of another method of determining noise. As described above, there are cases where motion vectors occur in the eye area due to the motion of the eyeball. Thus, in order to distinguish between motion vectors according to eyeball motion and motion vectors according to blinking, the noise determination unit 241 performs pupil detection (see, for example, G. Gomai, A. El-Zaart, H. Mathkour. A new approach for pupil detection in iris recognition system, Computer Engineering and Technology (ICCET), 2010 2nd International Conference on, vol. 4, no., pp. V4-415-V4-419, 16-18 Apr. 2010 doi: 10.1109/ICCET.2010.5485497). The noise determination unit 241 determines that blinking has not occurred by detecting the motion of the pupil, so that the erroneous detection rate in detecting blinking is reduced.

Figure 12:
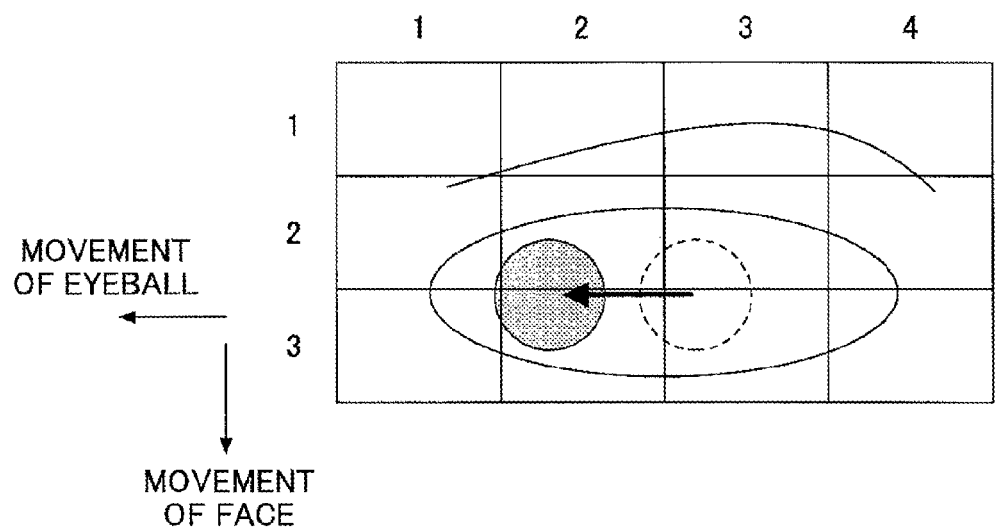
FIG. 12 is for describing noise determination (part 2)

FIG. 12 is for describing noise determination (part 2). As illustrated in FIG. 12, the noise determination unit 241 performs pupil detection in both the standard image and the reference image, and when a pupil is detected in both images and the motion of the pupil is detected, the noise determination unit 241 determines that blinking has not occurred.

The noise determination may be performed by either of the above two methods. However, by noise determination 2, there are cases where the pupil is not appropriately detected, and therefore noise determination 1 is considered to be more appropriate than noise determination 2.

Figure 13:
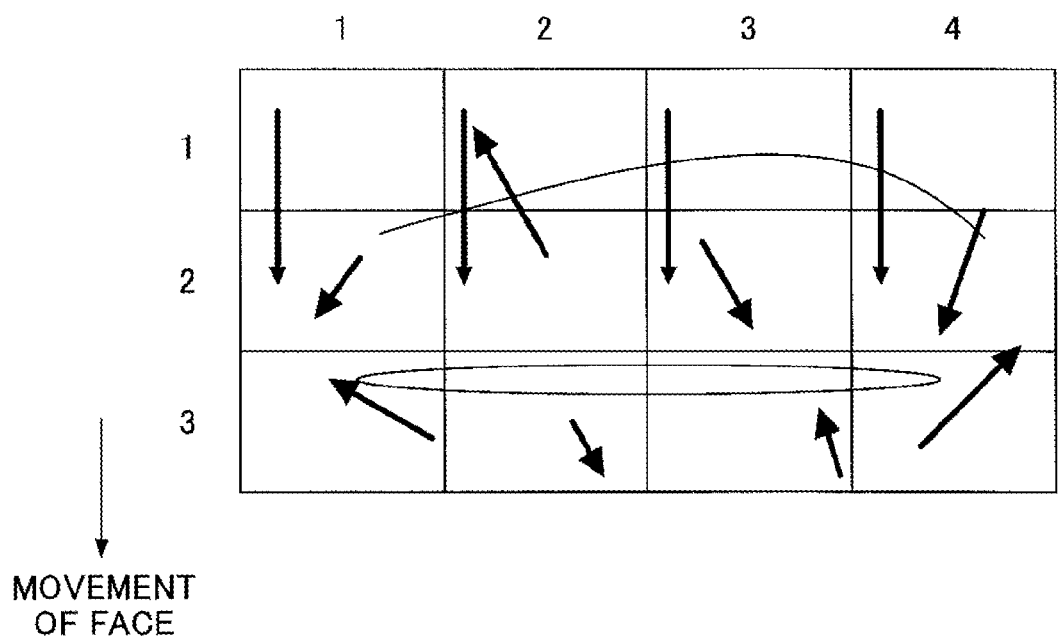
FIG. 13 illustrates an example of motion vectors when the eye is closed due to blinking.

FIG. 13 illustrates an example of motion vectors when the eye is closed due to blinking. As illustrated in FIG. 13, when blinking is performed, the eyeball is not detected, and the motion vectors in the blocks of the eye part are directed in various directions. Accordingly, by noise determination 1 or noise determination 2, blinking and eyeball motion are distinguished.

Blinking means to close the eye and to open the eye. In the above, a description is given of the method of detecting that the eye is closed, which is part of blinking. When detecting that the eye is open, the same process as the above process is performed to find the similarity between the motion vector of the face and the motion vectors in the eye area and detect that the eye is open.

Figure 14:
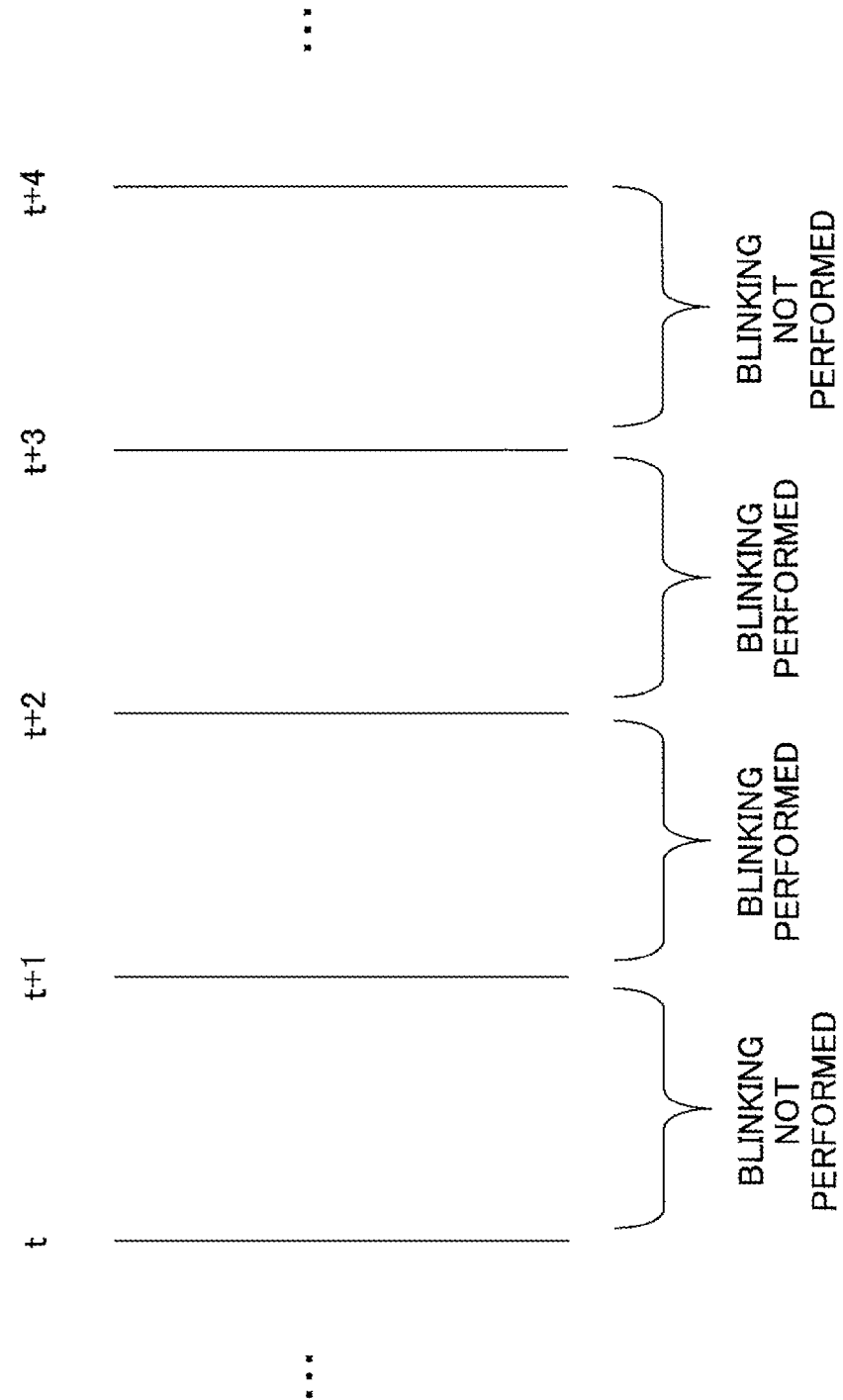
FIG. 14 is for describing determination of blinking.

FIG. 14 is for describing determination of blinking. In the example of FIG. 14, between the image of time t+1 and the image of time t+2, the eye is closed, which is part of blinking, and the image processing apparatus 10 determines that part of blinking has occurred. Furthermore between the image of time t+2 and the image of time t+3, the eye is opened, which is part of blinking, and the image processing apparatus 10 determines that part of blinking has occurred. The parts of blinking are not always detected continuously.

The determination unit 204 determines that blinking has occurred when the time between t+1 and t+3 is shorter than a predetermined time before the present time set in advance as the time taken for blinking. Furthermore, the determination unit 204 may determine that blinking has occurred when at least two parts of blinking are detected within a predetermined time.

Note that by using the above method, the determination unit 204 does not only detect blinking, but separately detects either the opening of the eye or the closing of the eye, so that the time when the person falls asleep or the time when the person wakes up may be detected. For example, after detecting the closing of the eye, the determination unit 204 determines that the eye is kept closed when a part of blinking is not detected for a predetermined time.

Operation

Next, a description is given of the operation of the image processing apparatus 10 according to the present embodiment. In the following, a description is given of two determination processes. The first process is performed by determining a part of blinking with the use of similarity and performing noise determination. The second process is performed by determining a part of blinking by using the number of motion vectors.

Determination Process Using Similarity

Figure 15:
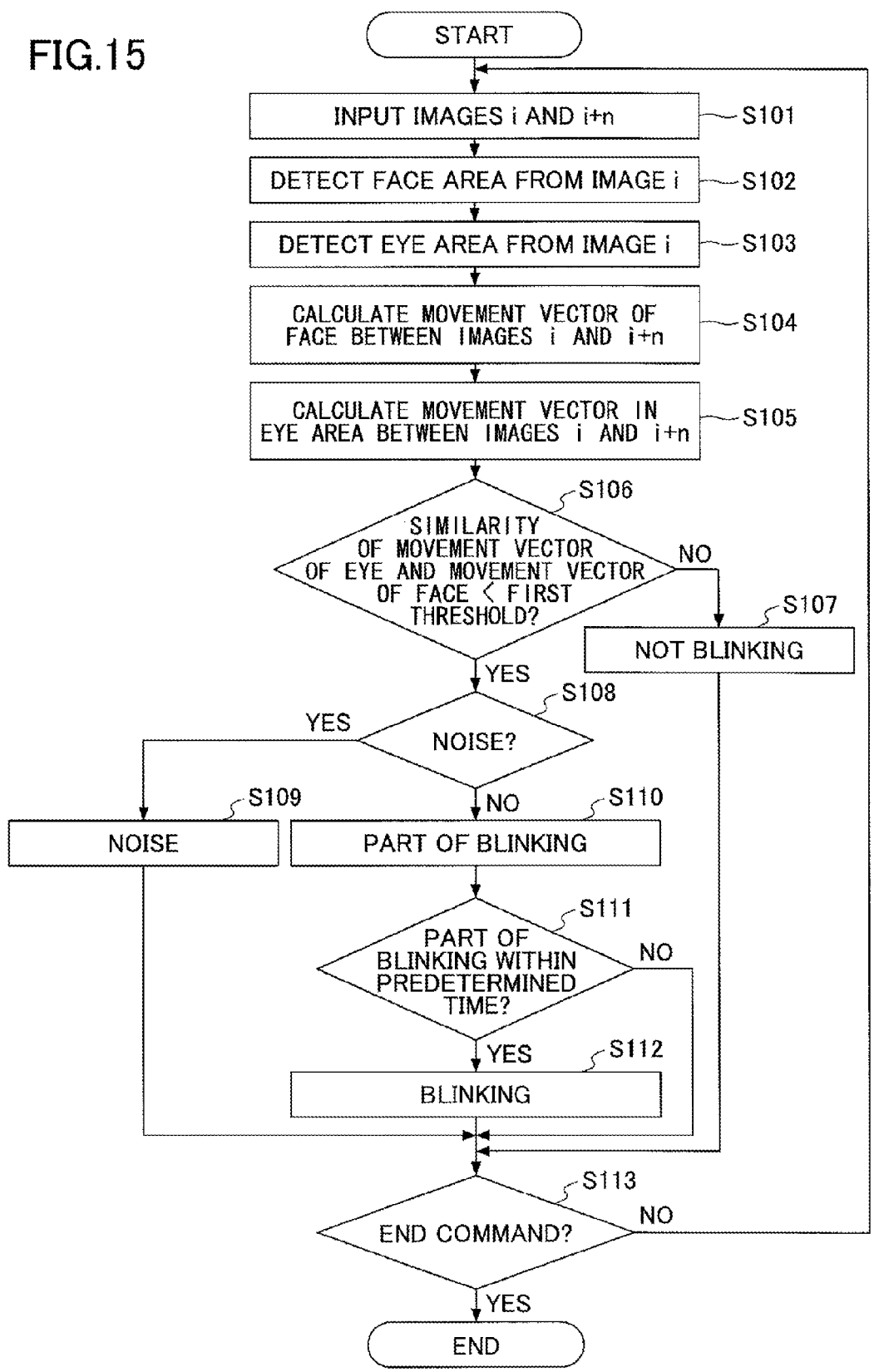
FIG. 15 is a flowchart indicating an example of a blinking determination process (part 1)

FIG. 15 is a flowchart indicating an example of a blinking determination process (part 1). In step S101 of FIG. 15, the detection unit 201 inputs an image and an image i+n. n is, for example, a positive integer such as 1.

In step S102, the face detection unit 211 detects a face area from the image i. In step S103, the eye detection unit 212 detects an eye area from the image i.

In step S104, the face motion vector calculation unit 221 detects a motion vector of the face between the image i and the image i+n.

In step S105, the eye motion vector calculation unit 222 calculates a motion vector for each block in the eye area, between the image i and the image i+n.

In step S106, the similarity calculation unit 203 calculates a representative value of similarities between a motion vector of the face (first motion vector) and a group of motion vectors of the eye (second motion vector), and determines whether this representative value is greater than a first threshold. When the representative value is less than the first threshold (YES in step S106), the process proceeds to step S108, and when the representative value is greater than or equal to the first threshold (NO in step S106), the process proceeds to step S107.

In step S107, the determination unit 204 determines that the motion of the eye between the image and the image i+n is not blinking.

In step S108, the noise determination unit 241 determines whether the detected motion is noise, based on characteristics of motion vectors in the eye area. Noise determination is performed by using either one of noise determination 1 or noise determination 2 described above. When the motion is determined as noise (YES in step S108), the process proceeds to step S109, and when the motion is not determined as noise (NO in step S108), the process proceeds to step S110.

In step S109, the noise determination unit 241 determines that the motion is noise (for example, eyeball motion). In step S110, the determination unit 204 determines that the motion is part of blinking.

In step S111, the determination unit 204 determines whether part of blinking has already been determined from the present time to a predetermined time set in advance. When part of blinking has already been determined (YES in step S111), the process proceeds to step S112, and when part of blinking has not been determined (NO in step S111), the process proceeds to step S113.

In step S112, the determination unit 204 determines that the series of motions of the eye within the predetermined time is blinking.

In step S113, the image processing apparatus 10 determines whether an end command of blink detection has occurred. The end command occurs when the user presses an end button. When an end command occurs (YES in step S113), the blink detection process ends, and when an end command has not occurred (NO in step S113), i is updated and the process returns to step S101.

Determination Process Using Number of Motion Vectors

Figure 16:
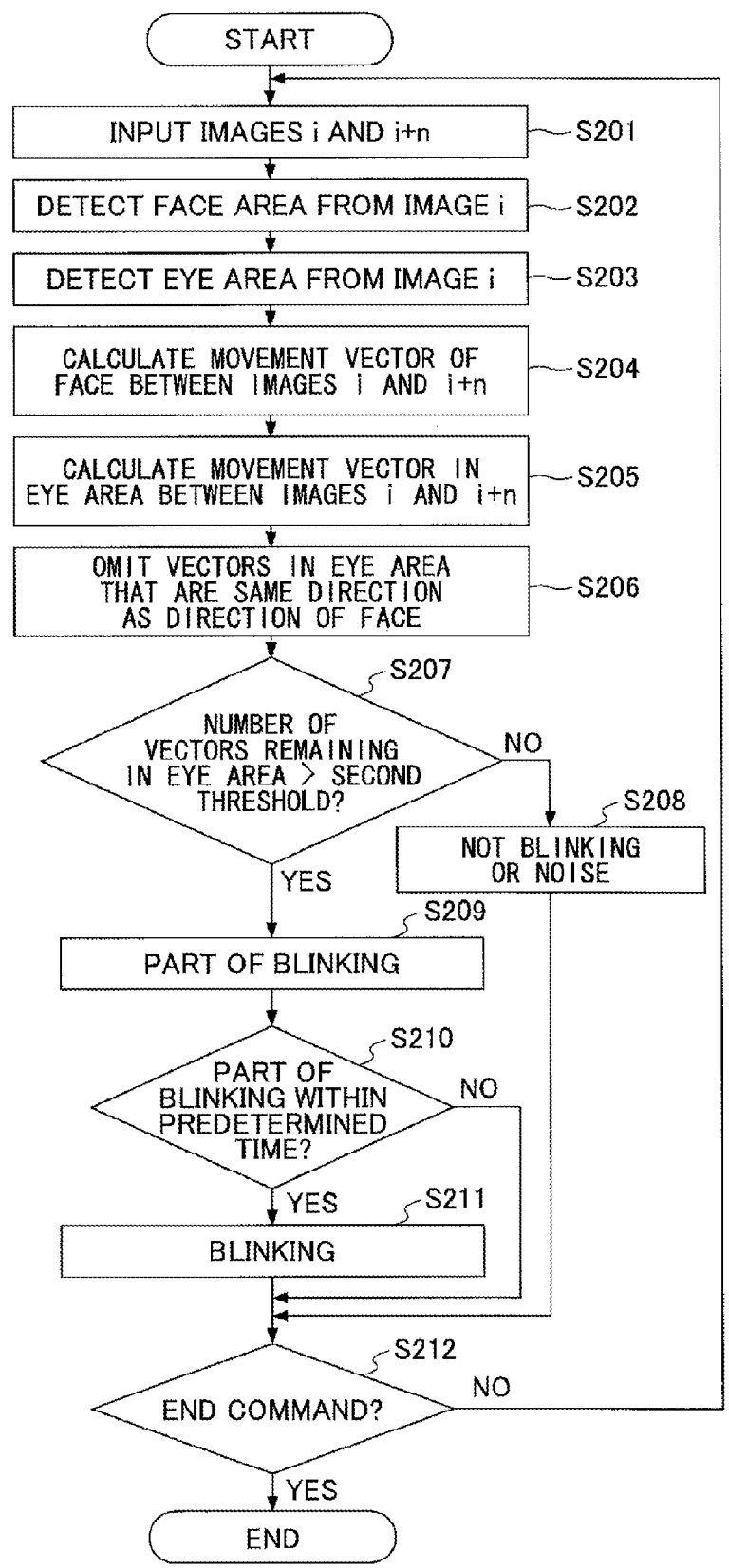
FIG. 16 is a flowchart indicating an example of a blinking determination process (part 2).

FIG. 16 is a flowchart indicating an example of a blinking determination process (part 2). Steps S201 through S205 of FIG. 16 are the same as steps S101 through S105 of FIG. 15, and are thus not further described.

In step S206, among the motion vectors of the eye, the similarity calculation unit 203 omits the motion vectors in the same direction as the motion vector of the face. The same direction is not always a matching direction; a predetermined amount of error may be included in the direction.

In step S207, the determination unit 204 determines whether the number of motion vectors remaining in the eye area is greater than a second threshold. When the number of motion vectors is greater than the second threshold (YES in step S207), the process proceeds to step S209, and when the number of vectors is less than or equal to the second threshold (NO in step S207), the process proceeds to step S208. In step S208, the determination unit 204 determines that blinking has not occurred, or the motion is noise.

Steps S209 through S212 of FIG. 16 are the same as steps S110 through S113 of FIG. 15, and are thus not further described.

As indicated in FIG. 16, by using the number of motion vectors, "noise" and "no blinking" may be determined at once, and therefore the blinking determination process is simplified. Furthermore, the second threshold may be changed according to the distance between the face and the imaging unit 11 and the posture of the face.

As described in the above embodiment, the performance in blink detection is improved even in cases where the resolution is low and the target moves. Furthermore, according to the embodiment, noise caused by an eyeball motion or variations in the lighting conditions may be appropriately eliminated, and so that errors in detecting blinking are prevented.

Modification

By recording a program for realizing the image processing described in the above embodiment in a recording medium, a computer may be caused to execute the image processing of the embodiment. For example, this program may be recorded in a recording medium, a computer is caused to read the recording medium recording this program, and the above image processing may be realized.

As the recording medium, various types of recording media may be used, such as a recording medium for optically, electrically, or magnetically recording information such as a CD-ROM, a flexible disk, and a magnet-optical disk, and a semiconductor memory for electrically recording information such as a ROM and a flash memory. The recording medium does not include carrier waves.

According to an aspect of the embodiments, an image processing apparatus and an image processing method are provided, by which the performance in blink detection is improved even in cases where the resolution is low and the target moves.

The present invention is not limited to the specific embodiments described herein, and variations and modifications may be made without departing from the scope of the present invention. Furthermore, all of or some of the constituent elements in the above embodiment may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a memory; and
a processor coupled to the memory which executes a process including:
  detecting a face area and an eye area from images that are sequentially input;
  calculating, between two of the images, a first motion vector in the face area and second motion vectors, each of the second motion vectors corresponding respectively to each of a plurality of blocks obtained by dividing the eye area;
  calculating, for each pair of the images, a plurality of similarities by calculating a similarity between the first motion vector and each of the second motion vectors, wherein each of the plurality of similarities is calculated based on a cosine value of an angle between the first motion vector and one of the second motion vectors;
  calculating an average similarity based on the calculated plurality of similarities; and
  determining whether a part of blinking has occurred by comparing the average similarity with a threshold.

2. The image processing apparatus according to claim 1, wherein the process further includes determining, after determining that the part of the blinking has occurred, whether noise has occurred based on a characteristic including at least one of a number of the second motion vectors, a direction of the second motion vectors, and a length of the second motion vectors.

3. The image processing apparatus according to claim 1, wherein the process further includes detecting, after determining that the part of the blinking has occurred, a pupil or an iris in the eye area, and determine whether noise has occurred based on a detection result of a movement of the pupil or the iris.

4. The image processing apparatus according to claim 1, wherein the process further includes determining that the blinking has occurred when at least the part of the blinking and another part of the blinking are determined within a predetermined time.

5. An image processing method executed by a processor coupled to a memory in a computer, the image processing method comprising:
  detecting a face area and an eye area from images that are sequentially input;
  calculating, between two of the images, a first motion vector in the face area and second motion vectors, each of the second motion vectors corresponding respectively to each of a plurality of blocks obtained by dividing the eye area;
  calculating, for each pair of the images, a plurality of similarities by calculating a similarity between the first motion vector and each of the second motion vectors, wherein each of the plurality of similarities is calculated based on a cosine value of an angle between the first motion vector and one of the second motion vectors;
  calculating an average similarity based on the calculated plurality of similarities; and
  determining whether a part of blinking has occurred by comparing the average similarity with a threshold.

6. A non-transitory computer-readable recording medium storing a program that causes a computer to execute a process comprising:
  detecting a face area and an eye area from images that are sequentially input;
  calculating, between two of the images, a first motion vector in the face area and second motion vectors, each of the second motion vectors corresponding respectively to each of a plurality of blocks obtained by dividing the eye area;
  calculating, for each pair of the images, a plurality of similarities by calculating a similarity between the first motion vector and each of the second motion vectors, wherein each of the plurality of similarities is calculated based on a cosine value of an angle between the first motion vector and one of the second motion vectors;

calculating an average similarity based on the calculated plurality of similarities; and determining whether a part of blinking has occurred by comparing the average similarity with a threshold.

7. The image processing apparatus according to claim 1, wherein the process further includes calculating an angular orientation distribution of motion vectors in the face area, and the first motion vector is calculated based on the calculated angular orientation distribution.

\* \* \* \* \*